June 22, 1926.
J. F. O'CONNOR
CAR CONSTRUCTION
Filed March 26, 1924
1,589,421
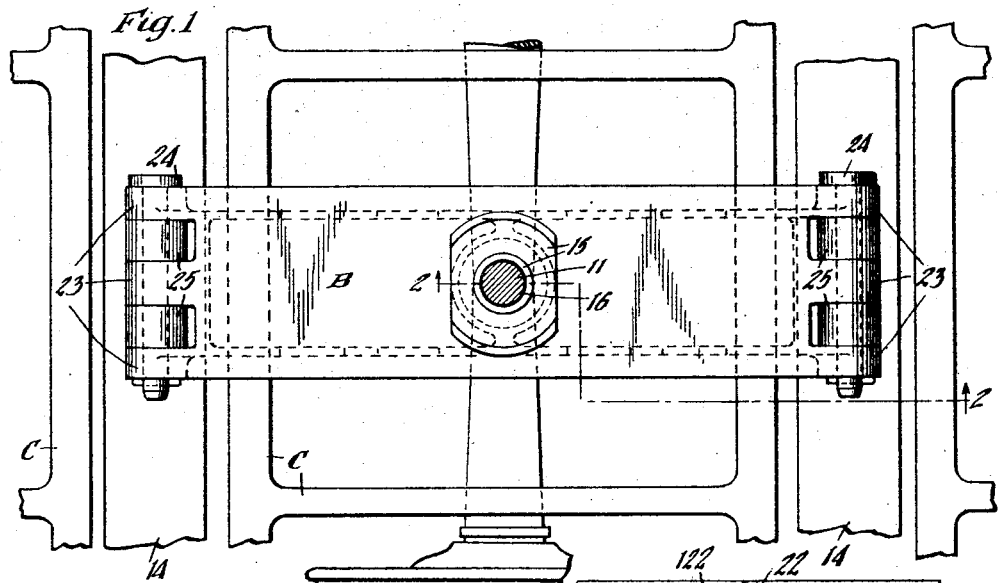
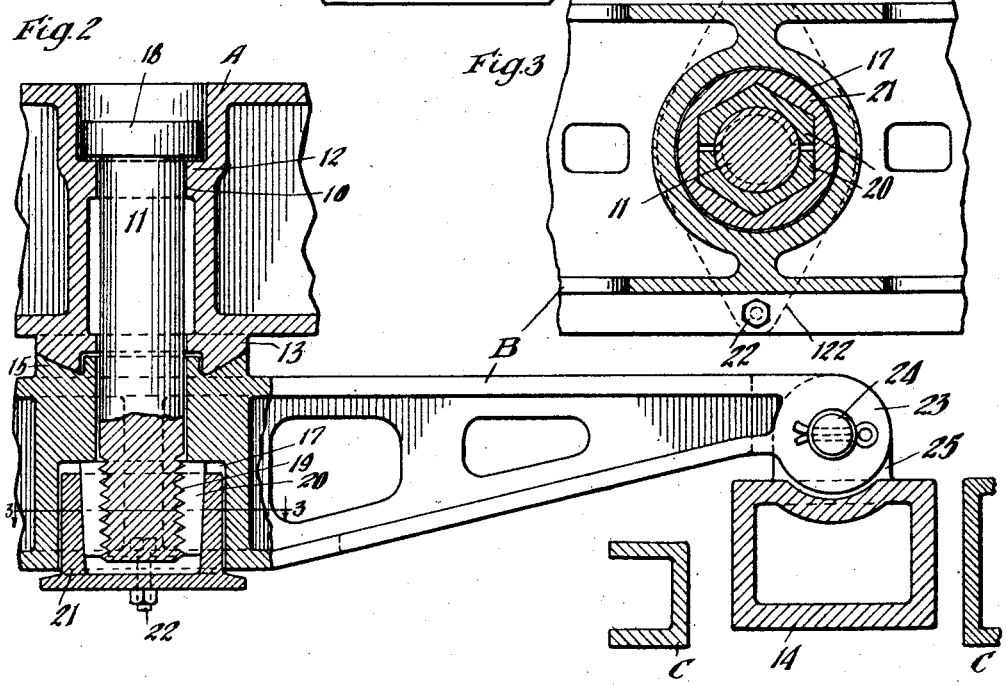
Witnesses
Wm. Geiger
Inventor
John F. O'Connor
By Geo. I. Haight
His Atty.

Patented June 22, 1926.

1,589,421

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

CAR CONSTRUCTION.

Application filed March 26, 1924. Serial No. 701,936.

This invention relates to improvements in car construction.

In the event of collision or derailment of railway cars, it quite often happens that the body and truck bolsters of the cars are separated vertically so that the cars are likely to overturn or be telescoped into one another. Experience has shown that when the body and truck bolsters of the car are so connected that they are prevented from accidental vertical separation, then in the event of collision, their tendency toward overturning or telescoping is greatly minimized. There has been little or no difficulty met with in applying the proper bolster locking means to cars having four-wheel trucks, as there is ample clearance available for the insertion and removal of said locking means. In the case of six-wheel trucks, however, and particularly in the case of dining, buffet, mail and baggage cars, the central axle of the truck is located immediately below the pivotal center of the truck, thus preventing access from below the center bearing, and access from above the bolster through the floor of the car is especially difficult and practical impossible, so that much difficulty has been encountered in designing a suitable locking connection between the bolsters for cars of the type indicated.

An object of my invention is to provide an improved car construction especially adapted for six-wheel trucks, wherein provision is made for effectively interlocking the body and truck to prevent their vertical separation, while at the same time allowing of easy disconnection of the truck from the body of the car, to facilitate repairs and the like.

A specific object of my invention is to provide, in a car structure, means for locking the body and truck bolsters against accidental vertical separation and at the same time, provide an extremely strong connection between the truck bolster and transoms of a six-wheel truck, the connection between the truck bolster and said transoms also permitting of relative movement between the truck bolster and the transoms in one direction.

Other objects and advantages of the invention will more clearly appear from the description and claims hereinafter following.

In the drawing forming a part of this specification, Figure 1 is a top plan view of a car structure, embodying my improvements therein. Figure 2 is a vertical, sectional view taken substantially on the line 2—2 of Figure 1. And Figure 3 is a horizontal sectional view taken substantially on the line 3—3 of Figure 2.

In said drawing, A denotes a body bolster adapted to be secured to the under side of a car body, said bolster having an aperture 10 through the center thereof to permit the insertion of a king or center pin 11.

The body bolster A is provided with an annular flange 12 at a point intermediate the top and bottom of the king pin opening 10. On the under side of the bolster A, an integral section 13 is provided in alinement with the king pin opening 10, said section 13 having preferably a convex under face providing a center bearing plate and suitably formed to receive the female projection of the corresponding center plate 15 of the truck bolster, it being obvious also, that the section 13 is centrally apertured to accommodate the king pin.

In six-wheel trucks, it is usual to employ two transversely extending transoms 14 supported from the truck frame proper C, each of these transoms being located between the central axle and one of the end axles, and extending parallel thereto. To transfer the load of the car to the transoms 14, it is customary to employ a bridge or spider B, said spider consisting of a casting adapted to extend substantially at right angles to said axles and to be connected at its ends to said transoms. The spider B is formed at the center of its top with a concave center bearing plate 15 conforming to the body bolster center bearing 13 and coacting therewith to permit pivotal movement between the bolsters.

The spider B is centrally apertured as at 16 to accommodate the king pin, this aperture being enlarged at the lower end to form a socket portion 17.

The king pin in the present construction is solid, thus preserving its full strength, one end having a head 18 adapted to be supported by the annular flange 12, the other end of the pin being threaded as at 19. A split or sectional nut 20 is adapted to be secured on the threaded end of the pin, said nut being tapered on its exterior, and adapted to lie within the socket portion 17 of the spider. In order to hold the sectional nut tightly in place upon the threads of the pin, I have provided a sleeve member 21, having its interior formed with a taper to correspond to the exterior of the nut and adapted to receive the same, said sleeve member also being provided with lateral extensions 122 having apertures at their ends, whereby they may be secured to the truck bolster my means of fastening bolts 22. As the bolts 22 are tightened, the sleeve member acts as a wedge to clamp the nut sections tightly onto the threaded end of the king pin and hold the same securely in place to prevent accidental vertical separation of the bolsters. In case rusting should occur between the coacting threads of the king pin and nut, a wedge may be driven into the slit between the mating edges of the sectional nut to remove the same from the pin, after the sleeve has been withdrawn.

The spider is detachably secured at its ends to the transoms in such a manner that the truck proper may be removed therefrom for inspection, repairs or the like. Each end of the spider is provided with a series or plurality of spaced lugs or bosses 23 having alined openings therethrough to receive a bolt 24, one end of the bolt having an integral head and the other provided with a cotter-pin-receiving aperture. Lugs or bosses 25 are also formed on the transoms, these lugs being spaced apart the required distance to intermesh with the lugs on the spider so as to form a hinge-like connection therewith, said lugs having apertures therethrough adapted to register with the apertures through the lugs of the spider. Thus the spider and transoms will be pivotally and detachably inter-connected so as to permit any slight vertical and angular relative movement therebetween, and as the bolts 24 are arranged in multiple shear, they will not be likely to become sheared off in the case of a collision or derailment, and thus they serve to prevent any tendency of over-turning or telescoping of the cars.

I have herein shown and described what I now consider the preferred manner of carrying out my invention but the same is merely illustrative and I contemplate all changes and modifications that come within the scope of the claims appended hereto.

I claim:

1. In car construction, the combination with a body bolster; of six-wheel truck transoms; a truck bolster adapted to be supported on said transoms; bolts detachably connecting said transoms to the truck bolster; a center pin detachably inter-connecting said truck and body bolsters; a sectional nut arranged on one end of said pin; and a sleeve removably secured to one of said bolsters and engaging said nut to prevent movement thereof relative to the pin.

2. In car construction, the combination with a body bolster; of six-wheel truck transoms; a truck bolster adapted to be supported on said transoms; bolts arranged longitudinally of said transoms and detachably inter-connecting said transoms and truck bolster; a solid center pin detachably inter-connecting said truck and body bolsters; a split nut arranged on one end of said pin; and means removably secured to one of said bolsters to clamp said nut onto the said pin and prevent relative movement therebetween.

3. In car construction, the combination with a body bolster; of transoms; a truck bolster extending transversely of said transoms; bolts arranged longitudinally of said transoms, and detachably and hingedly inter-connecting said transoms with the ends of said truck bolster; a solid center pin extending vertically through said truck and body bolsters; a split nut engaging the lower end of said pin; and a sleeve removably secured to the truck bolster for receiving said nut to prevent movement thereof relative to the pin.

4. In car construction, the combination with a body bolster; of a truck bolster; a center pin extended through said bolsters and having a threaded lower end; a sectional nut fitting said threaded portion of the pin; and a sleeve holding said nut in place against movement relatively of the pin and being detachably secured to said truck bolster.

5. In car construction, the combination with a body bolster; of a truck bolster having a socket in the under side thereof; a center pin adapted to be extended through said bolsters and having a threaded lower end to lie in said socket; a sectional nut fitting said threaded portion of the bolt; and a sleeve for holding said nut in place against movement relatively of the pin, said sleeve extending into said socket, and being detachably secured to said truck bolster.

6. In car construction, the combination with a body bolster; of a truck bolster, said bolsters apertured vertically through their centers, the aperture through said truck bolster being enlarged on the under side to form a socket; a headed center pin adapted to be extended through said bolsters and having a threaded lower end fitting into said socket portion of the truck bolster; a longitudinally split nut fitting said threaded portion of the pin; and a member for holding said nut in place against movement relatively of the pin, said member comprising a sleeve portion fitting into said socket and slidably but non-rotatably receiving said nut, and having projections for detachable connection to said truck bolster.

7. In car construction, the combination with a body bolster; of a truck bolster, said bolster having vertically alined openings therethrough and said truck bolster having its opening enlarged on its lower side to from a socket; a solid center pin extended through the aligned openings of said bolsters, said pin having an integral head at its upper end and a threaded portion at its lower end arranged to lie in said socket portion; a sectional nut adapted to fit said threaded portion of the pin, said nut being tapered on its exterior; and means for clamping said nut onto the threaded portion of said pin to prevent relative movement therebetween, said means comprising a sleeve portion having a tapered opening to coact with said tapered nut and wedge the latter onto said pin, and having projections for detachable connection to said truck bolster.

8. In car construction, the combination with a six-wheel truck transom; of a truck bolster; and means for detachably connecting an end of said bolster to said transom, said means including a heavy pin in multiple shear.

9. In car construction, the combination with a six-wheel truck transom; of a truck bolster; and means for detachably connecting an end of said bolster to said transom, said means comprising lugs on both of said parts, and a pin extending through said lugs to form a hinge therewith.

10. In car construction, the combination with a six-wheel truck transom; of a truck bolster; and means for detachably connecting an end of said bolster to said transom, said means comprising a plurality of lugs on said bolster and transom, said lugs being provided with alined openings therethrough; and a bolt removably insertable through said aligned apertures, longitudinally of said beam, so as to be in multiple shear.

11. In car construction, the combination with six-wheel truck transoms; of a truck bolster; and means at both ends of said bolster for detachably connecting said bolster to said transoms, said means comprising a plurality of apertured lugs on said bolster and transoms, and a single bolt at each end of said bolster, insertable through the apertures of said lugs for inter-connecting the bolster end with the cooperating transom.

12. In car construction, the combination with a six-wheel truck transom; of a truck bolster; and means for detachably connecting an end of said bolster to said transom, said means comprising a plurality of spaced lugs on said bolster, a plurality of spaced lugs on said transom, adapted to cooperate with said lugs on said bolster, with the lugs on one member lying between the lugs on the other member, all of said lugs provided with alined openings therethrough; and a bolt removably insertable through said alined openings longitudinally of said transom.

13. In a locking device, the combination with a pin having a threaded end; of a longitudinally split nut adapted to fit said threaded portion of the pin; and a sleeve member for slidably but non-rotatably receiving said nut.

14. In a locking device, the combination with a bolt having a threaded end; of a sectional, longitudinally split, internally threaded nut adapted to cooperate with said threaded portion of the bolt; a sleeve member for slidably but non-rotatably receiving said nut; and means for preventing accidental withdrawl of said sleeve member.

In witness that I claim the foregoing I have hereunto subscribed my name this 22nd day of March 1924.

JOHN F. O'CONNOR.